US012368837B2

(12) United States Patent
Wang et al.

(10) Patent No.: US 12,368,837 B2
(45) Date of Patent: Jul. 22, 2025

(54) METHOD AND SYSTEM FOR TRANSMITTING LIGHT FIELD DATA AND LIGHT FIELD COMMUNICATION APPARATUS

(71) Applicant: BOE Technology Group Co., Ltd., Beijing (CN)

(72) Inventors: Mingdong Wang, Beijing (CN); Yapeng Li, Beijing (CN); Yangbing Li, Beijing (CN); Xuan Feng, Beijing (CN); Yuanyuan Ma, Beijing (CN); Fangyuan Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/029,367

(22) PCT Filed: Apr. 26, 2022

(86) PCT No.: PCT/CN2022/089380
§ 371 (c)(1),
(2) Date: Mar. 29, 2023

(87) PCT Pub. No.: WO2023/206098
PCT Pub. Date: Nov. 2, 2023

(65) Prior Publication Data
US 2024/0430401 A1    Dec. 26, 2024

(51) Int. Cl.
*H04N 13/383* (2018.01)
*H04N 23/957* (2023.01)

(52) U.S. Cl.
CPC ......... *H04N 13/383* (2018.05); *H04N 23/957* (2023.01)

(58) Field of Classification Search
CPC ... H04N 13/383; H04N 23/957; H04N 13/366
USPC .......................................................... 348/47
See application file for complete search history.

(56) References Cited

U.S. PATENT DOCUMENTS

| 10,453,431 | B2 * | 10/2019 | El-Ghoroury .......... G09G 3/003 |
| 10,558,264 | B1   | 2/2020  | Watson |
| 10,712,572 | B1   | 7/2020  | Liu et al. |
| 10,979,685 | B1   | 4/2021  | Silverstein |
| 11,212,514 | B2 * | 12/2021 | Karafin .................. H04N 13/32 |
| 11,415,935 | B2 * | 8/2022  | Hornstein ............ H04N 13/302 |
| 11,849,102 | B2 * | 12/2023 | Hornstein ................. G06T 7/33 |

(Continued)

FOREIGN PATENT DOCUMENTS

| CN | 101072366 A | 11/2007 |
| CN | 104091361 A | 10/2014 |

(Continued)

*Primary Examiner* — Gims S Philippe
(74) *Attorney, Agent, or Firm* — IPro, PLLC

(57) ABSTRACT

The present disclosure discloses a method and system for transmitting light field data and a light field communication apparatus, wherein the light field communication apparatus can process first light field data acquired by at least one target camera corresponding to a first gaze point location and transmit the first light field data to the light field display apparatus based on the first gaze point location fed back by the light field display apparatus. The light field display apparatus may in turn perform light field display based on the first light field data on the light field display screen thereof.

17 Claims, 5 Drawing Sheets

(56) References Cited

U.S. PATENT DOCUMENTS

| | | | |
|---|---|---|---|
| 2014/0035959 A1* | 2/2014 | Lapstun | G02F 1/33 |
| | | | 359/200.7 |
| 2014/0104392 A1 | 4/2014 | Rn et al. | |
| 2015/0201176 A1* | 7/2015 | Graziosi | H04N 13/243 |
| | | | 348/43 |
| 2015/0350531 A1* | 12/2015 | Ishida | H04N 23/67 |
| | | | 348/349 |
| 2017/0345213 A1 | 11/2017 | Ernst et al. | |
| 2018/0173303 A1 | 6/2018 | Liu et al. | |
| 2020/0296327 A1* | 9/2020 | Karafin | G03H 1/2294 |
| 2021/0019912 A1* | 1/2021 | Cutler | H04N 7/142 |
| 2021/0132693 A1 | 5/2021 | Pulli et al. | |
| 2021/0208675 A1 | 7/2021 | Qin et al. | |
| 2022/0365342 A1 | 11/2022 | Wu | |

FOREIGN PATENT DOCUMENTS

| | | |
|---|---|---|
| CN | 108604390 A | 9/2018 |
| CN | 107423629 B | 10/2020 |
| CN | 113138664 A | 7/2021 |
| WO | 2019233210 A1 | 12/2019 |

\* cited by examiner ically to realize 3D immersive video interaction has become a major development direction of current video communication technology.
METHOD AND SYSTEM FOR TRANSMITTING LIGHT FIELD DATA AND LIGHT FIELD COMMUNICATION APPARATUS The present application is a 371 of PCT Patent Application Serial No. PCT/CN2022/089380, filed on Apr. 26, 2022 and entitled "METHOD AND SYSTEM FOR TRANSMITTING LIGHT FIELD DATA AND LIGHT FIELD COMMUNICATION APPARATUS", the entire contents of which are incorporated herein by reference.

TECHNICAL FIELD

The present disclosure relates to the field of communications technologies, and in particular to a method and system for transmitting light field data and a light field communication apparatus.

BACKGROUND OF THE INVENTION

With the development of three-dimensional (3D) reconstruction technology and light field display technology, combining these two technologies to realize 3D immersive video interaction has become a major development direction of current video communication technology.

In the related art, 3D video communication may be achieved by two light field display apparatuses. Each light field display apparatus includes a plurality of cameras, and light field data acquired by the cameras may be processed and then sent to another light field display apparatus. The other light field display apparatus may in turn display the light field data in 3D.

SUMMARY OF THE INVENTION

The present disclosure provides a method and system for transmitting light field data and a light field communication apparatus. The technical solutions are as follows.

In one aspect, a method for training an image processing model is provided, which is applied to a light field communication apparatus, wherein the light field communication apparatus includes a plurality of first cameras; the method includes:

receiving a first gaze point location sent by a light field display apparatus, the first gaze point location being a location of a gaze point of eyes of a viewer of the light field display apparatus on a light field display screen of the light field display apparatus;

determining at least one target camera corresponding to the first gaze point location from the first cameras, the number of the at least one target camera being less than the number of the first cameras; and processing first light field data acquired by the at least one target camera and then transmitting the first light field data to the light field display apparatus, the processed first light field data being used for light field display of the light field display apparatus.

Optionally, a corresponding relationship between the gaze point locations and the cameras is stored in the light field communication apparatus, wherein a plurality of different gaze point locations is recorded in the corresponding relationship, each gaze point location corresponds to at least one of the first cameras, and the number of the at least one first camera corresponding to each gaze point location is less than the number of the first cameras; and determining the at least one target camera corresponding to the first gaze point location from the first cameras includes:

determining the at least one target camera corresponding to the first gaze point location according to the corresponding relationship.

Optionally, the light field communication apparatus further includes: a plurality of data processing chips, each data processing chip being connected with at least one first camera; and processing the first light field data acquired by the at least one target camera includes:

processing the first light field data acquired by the at least one target camera through at least one target data processing chip of the data processing chips, the at least one target data processing chip being connected with the at least one target camera.

Optionally, the first gaze point location corresponds to a plurality of target cameras; and the target cameras are connected with a plurality of different target data processing chips in a one-to-one correspondence.

Optionally, each data processing chip is connected with a plurality of first cameras; and processing the first light field data acquired by the at least one target camera through the at least one target data processing chip of the data processing chips includes:

controlling the at least one target data processing chip to process the first light field data acquired by the at least one target camera, without processing data acquired by the first cameras other than the at least one target camera.

Optionally, before processing the first light field data acquired by the at least one target camera, the method further includes:

controlling the at least one target camera to acquire light field data and controlling the first cameras of the first cameras other than the at least one target camera to stop transmitting light field data.

Optionally, the light field communication apparatus further includes an eye tracking camera and the light field display screen; the method further includes:

acquiring, by the eye tracking camera, a second gaze point location, the second gaze point location being a location of a gaze point of eyes of a viewer of the light field communication apparatus on the light field display screen of the light field communication apparatus;

transmitting the second gaze point location to the light field display apparatus;

receiving second light field data transmitted by the light field display apparatus, wherein the second light field data are acquired by at least one second camera in the light field display apparatus, and the at least one second camera is determined based on the second gaze point location; and performing light field display based on the second light field data.

In another aspect, a light field communication apparatus is provided, including: a main control circuit, a data processing circuit, and a plurality o first cameras, wherein the main control circuit is configured to:

receive a first gaze point location sent by a light field display apparatus, the first gaze point location being a location of a gaze point of eyes of a viewer of the light field display apparatus on a light field display screen of the light field display apparatus;

and determine at least one target camera corresponding to the first gaze point location from the first cameras, the number of the at least one target camera being less than the number of the first cameras; and the data processing circuit is configured to process first light field data acquired by the at least one target camera and then transmit the first light field data to the light field display apparatus, the processed first light field data being used for light field display of the light field display apparatus.

Optionally, a corresponding relationship between the gaze point locations and the cameras is stored in the main control circuit, wherein a plurality of different gaze point locations is recorded in the corresponding relationship, each gaze point location corresponds to at least one of the first cameras, and the number of the corresponding at least one first camera is less than the number of the first cameras; and the main control circuit is configured to determine at least one target camera corresponding to the first gaze point location according to the corresponding relationship.

Optionally, the data processing circuit includes a plurality of data processing chips, each data processing chip being connected with at least one first camera; and at least one target data processing chip of the data processing chips is connected with the at least one target camera, the at least one target data processing chip being configured to process the first light field data acquired by the at least one target camera.

Optionally, the first gaze point location corresponds to a plurality of target cameras; and the target cameras are connected with a plurality of different target data processing chips in a one-to-one correspondence.

Optionally, each data processing chip is connected with a plurality of first cameras; and the main control circuit is configured to:

control the at least one target data processing chip to process the first light field data acquired by the at least one target camera, without processing data acquired by the first cameras other than the at least one target camera.

Optionally, the main control circuit is further configured to:

control the at least one target camera to acquire light field data and control the first cameras of the first cameras other than the at least one target camera to stop transmitting light field data.

Optionally, the light field communication apparatus further includes an eye tracking camera, a display processing circuit, and a light field display screen, wherein the eye tracking camera is configured to acquire a second gaze point location and transmit the second gaze point location to the light field display apparatus, the second gaze point location being a location of a gaze point of eyes of a viewer of the light field communication apparatus on the light field display screen of the light field communication apparatus;

the display processing circuit is configured to receive and process second light field data transmitted by the light field display apparatus, wherein the second light field data are acquired by at least one second camera in the light field display apparatus, and the at least one second camera is determined based on the second gaze point location; and the light field display screen is configured to perform light field display based on the second light field data.

In still another aspect, a light field data transmission system is provided, including: a light field communication apparatus and a light field display apparatus, wherein the light field communication apparatus is the light field communication apparatus described in the above aspects; and the light field display apparatus is configured to send a first gaze point location to the light field communication apparatus and perform light field display based on first light field data transmitted by the light field communication apparatus.

In yet still another aspect, a light field communication apparatus is provided, including: a plurality of first cameras, a processor, and a memory having an instruction stored therein, wherein the instruction, when loaded and executed by the processor, causes the light field communication apparatus to implement the method for transmitting light field data as described in the above aspects.

In yet still another aspect, a computer readable storage medium having an instruction stored therein is provided, wherein the instruction, when loaded and executed by a processor, causes the light field communication apparatus to implement the method for transmitting light field data as described in the above aspects.

DETAILED DESCRIPTION

For clearer descriptions of the objects, technical solutions, and advantages of the present disclosure, the embodiments of the present disclosure are further described in detail below with reference to the drawings.

Figure 1:
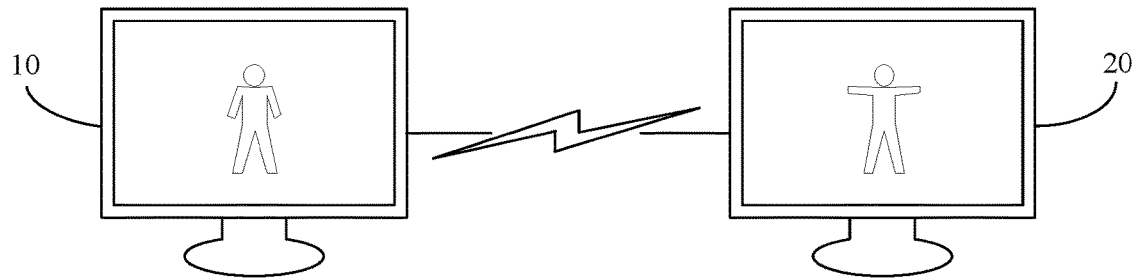
FIG. 1 is a schematic structural diagram of a light field data transmission system according to an embodiment of the present disclosure.

FIG. 1 is a schematic structural diagram of a light field data transmission system according to an embodiment of the present disclosure; referring to FIG. 1, the system includes: a light field communication apparatus 10 and a light field display apparatus 20. A wired or wireless communication connection is established between the light field communication apparatus 10 and the light field display apparatus 20. The light field communication apparatus 10 may be a communication apparatus provided with a plurality of cameras (e.g., light field cameras) and capable of processing and transmitting light field data acquired by the cameras. For example, the light field communication apparatus 10 may be a mobile phone, a tablet computer, a notebook computer, a desktop computer, a vehicle-mounted terminal, a wearable apparatus, or the like. The light field display apparatus 20 may be a display apparatus provided with a light field display screen, wherein the light field display screen of the light field display apparatus 20 may be a flat display screen.

In an embodiment of the present disclosure, the light field display apparatus 20 can determine a first gaze point location of eyes of a viewer on the light field display screen and transmit the first gaze point location to the light field communication apparatus 10. The light field communication apparatus 10 can determine at least one target camera corresponding to the first gaze point from the first cameras based on the first gaze point location sent by the light field display apparatus 20, process the first light field data acquired by the at least one target camera, and then transmit the first light field data to the light field display apparatus 20. The light field display apparatus 20 may in turn perform light field display based on the first light field data.

The above example takes the case where the light field communication apparatus 10, as a collection apparatus of light field data, provides the light field data to the light field display apparatus 20, and the light field display apparatus 20, as a display apparatus, performs light field display based on the light field data provided by the light field communication apparatus 10 as an example for illustration.

Optionally, the light field communication apparatus 10 may further include a light field display screen, and the light field communication apparatus 10 may transmit a second gaze point location to the light field display apparatus 20, the second gaze point location being a location of a gaze point of eyes of a viewer of the light field communication apparatus 10 on the light field display screen of the light field communication apparatus 10. The light field display apparatus 20 is provided with a plurality of second cameras, and the light field display apparatus 20 may determine at least one target camera corresponding to the second gaze point from the second cameras based on the second gaze point location, process second light field data acquired by the at least one target camera, and then transmit the second light field data to the light field communication apparatus 10. The light field communication apparatus 10 may in turn perform light field display based on the second light field data. Therefore, the bidirectional transmission and display of the light field data between the light field communication apparatus 10 and the light field display apparatus 20 may be achieved. Illustratively, the light field communication apparatus 10 and the light field display apparatus 20 may implement 3D video communication.

Figure 2:
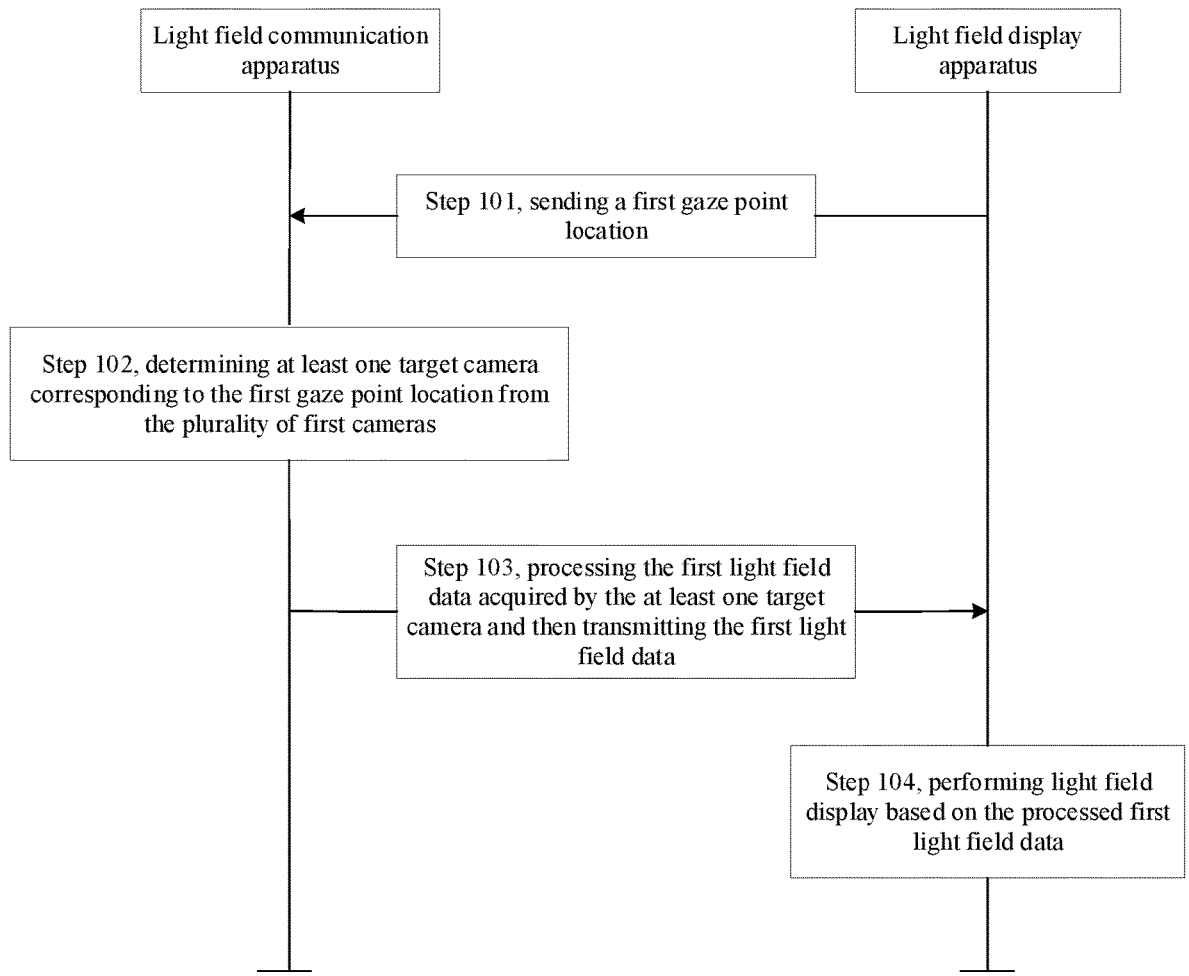
FIG. 2 is a schematic flowchart of a method for transmitting light field data according to an embodiment of the present disclosure.

FIG. 2 is a schematic flowchart of a method for transmitting light field data according to an embodiment of the present disclosure; the method is applicable to a light field data transmission system, for example, the light field data transmission system shown in FIG. 1. Referring to FIG. 2, the method includes the following steps.

In step 101, the light field display apparatus sends a first gaze point location to the light field communication apparatus.

In an embodiment of the present disclosure, the light field display apparatus can track a location of eyes (e.g., pupils) of a viewer to determine a location of a gaze point of the eyes on the light field display screen, i.e., a first gaze point location, wherein the first gaze point location may be a projection location of the pupils of the viewer on the light field display screen. Then, the light field display apparatus can transmit the first gaze point location to the light field communication apparatus.

Optionally, the light field display apparatus may acquire and transmit the first gaze point location after establishing a communication connection with the light field communication apparatus. For example, the light field display apparatus may acquire and transmit the first gaze point location in real time, or the light field display apparatus may acquire and transmit the first gaze point location according to a preset tracking period.

In step 102, the light field communication apparatus determines at least one target camera corresponding to the first gaze point location from the first cameras.

In an embodiment of the present disclosure, the light field communication apparatus includes a plurality of first cameras. The first cameras are configured to acquire light field data. The first cameras may be light field cameras, and the light field data acquired by the light field cameras may be image data. After the light field communication apparatus acquires the first gaze point location fed back by the light field display apparatus, at least one target camera corresponding to the first gaze point location can be determined from the first cameras based on the first gaze point location.

Optionally, the light field communication apparatus may store a corresponding relationship between the gaze point locations and the cameras in advance. The light field communication apparatus can directly determine at least one target camera corresponding to the first gaze point location based on the corresponding relationship. Or, the light field communication apparatus may determine a field of view range of a viewer based on the first gaze point location, and then determine at least one target camera according to the field of view range and the range of collecting the light field data of each first camera. The active area of the first light field data acquired by the at least one target camera on the light field display screen can cover the field of view range, wherein the number of the at least one target camera is less than the number of the first cameras. Illustratively, the number of first cameras included in the light field communication apparatus may be 10, and the number of target cameras may be 4.

It may be understood that the light field communication apparatus may control the first cameras to acquire light field data after establishing a communication connection with the light field display apparatus.

In step 103, the light field communication apparatus processes the first light field data acquired by the at least one target camera and transmits the first light field data to the light field display apparatus.

After the light field communication apparatus determines the at least one target camera from the first cameras, the first light field data acquired by the at least one target camera can be acquired and processed. Then, the light field communication apparatus can transmit the processed first light field data to the light field display apparatus. The processing of the first light field data by the light field communication apparatus may include: distortion correction processing, projective transformation processing, color correction processing, encoding processing, and the like.

In step 104, the light field display apparatus performs light field display based on the processed first light field data.

The light field display apparatus can perform light field display based on the received first light field data on the light field display screen thereof through a light field display technology so as to achieve 3D image display.

It may be understood that the light field data (i.e., 3D images) displayed by the light field display apparatus cannot all enter the eyes of the viewer, as limited by the pupil size of the eyes of the viewer. That is, the viewer cannot simultaneously view all the light field data displayed by the light field display apparatus. Therefore, the light field communication apparatus may process only the first light field data acquired by the at least one target camera corresponding to the gaze point location of the viewer and transmit the first light field data to the light field display apparatus for light field display. Thus, on the premise of ensuring the viewing effect, redundant light field data may be prevented from occupying excessive transmission bandwidth.

In summary, the embodiment of the present disclosure provides a method for transmitting light field data, wherein the light field communication apparatus can process first light field data acquired by at least one target camera corresponding to a first gaze point location based on the first gaze point location fed back by the light field display apparatus and then transmit the first light field data to the light field display apparatus. The light field display apparatus may in turn perform light field display based on the first light field data on the light field display screen thereof. Since the light field communication apparatus only needs to process and transmit the light field data acquired by part of the light field cameras and corresponding to the first gaze point location, the processing efficiency for light field data may be effectively improved and the transmission bandwidth occupied by the light field data is reduced without influencing the viewing effect.

Figure 3:
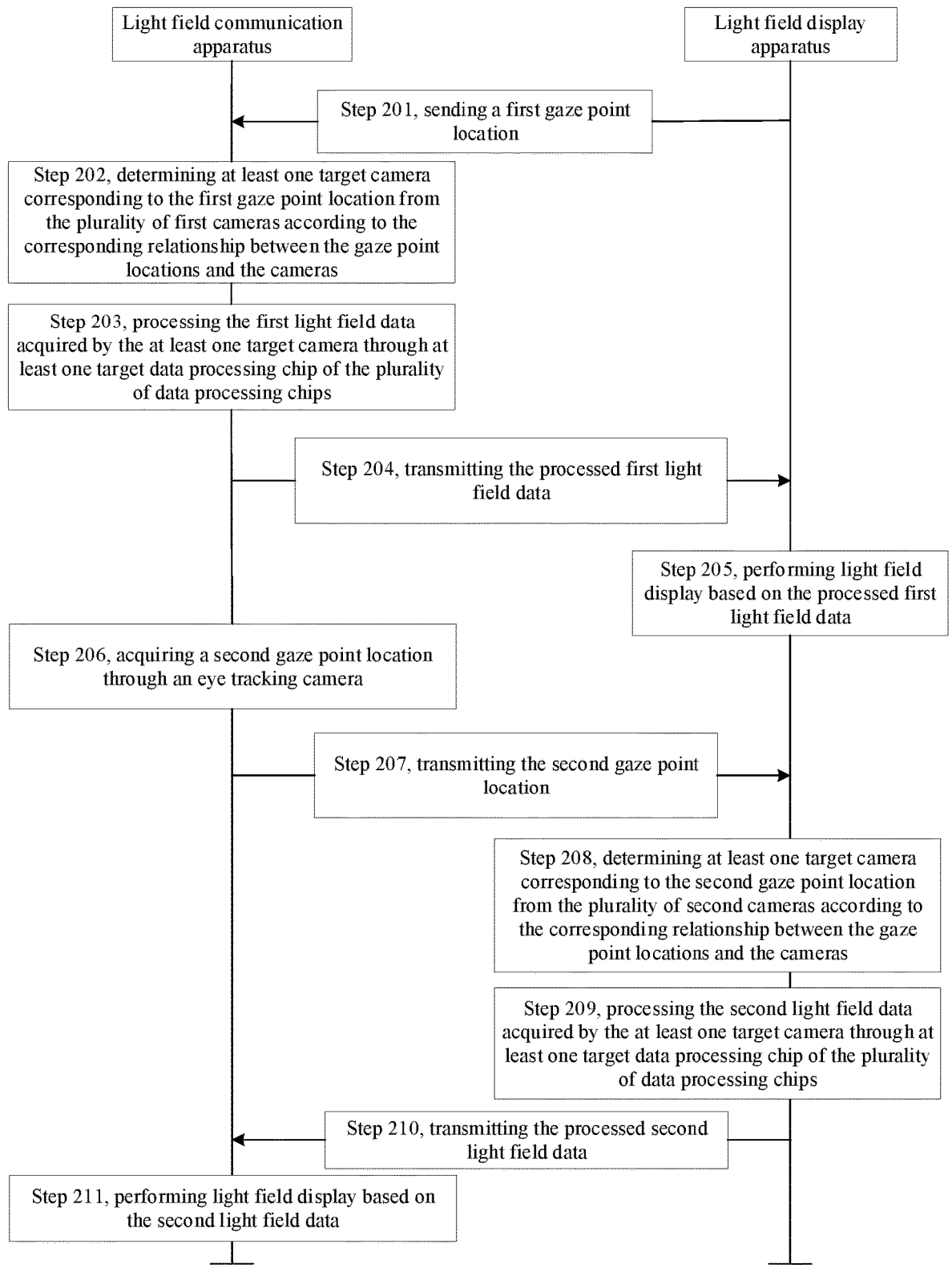
FIG. 3 is a schematic flowchart of another method for transmitting light field data according to an embodiment of the present disclosure.

FIG. 3 is a schematic flowchart of another method for transmitting light field data according to an embodiment of the present disclosure; referring to FIG. 3, the method may include the following steps.

In step 201, the light field display apparatus sends a first gaze point location to the light field communication apparatus.

In an embodiment of the present disclosure, the light field display apparatus can track a location of eyes (e.g., pupils) of a viewer to determine a location of a gaze point of the eyes on the light field display screen, i.e., a first gaze point location, wherein the first gaze point location may be a projection location of the pupils of the viewer on the light field display screen. Then, the light field display apparatus can transmit the first gaze point location to the light field communication apparatus.

Optionally, the light field display apparatus may acquire and transmit the first gaze point location after establishing a communication connection with the light field communication apparatus. For example, the light field display apparatus may acquire and transmit the first gaze point location in real time, or the light field display apparatus may acquire and transmit the first gaze point location according to a preset tracking period.

Figure 4:
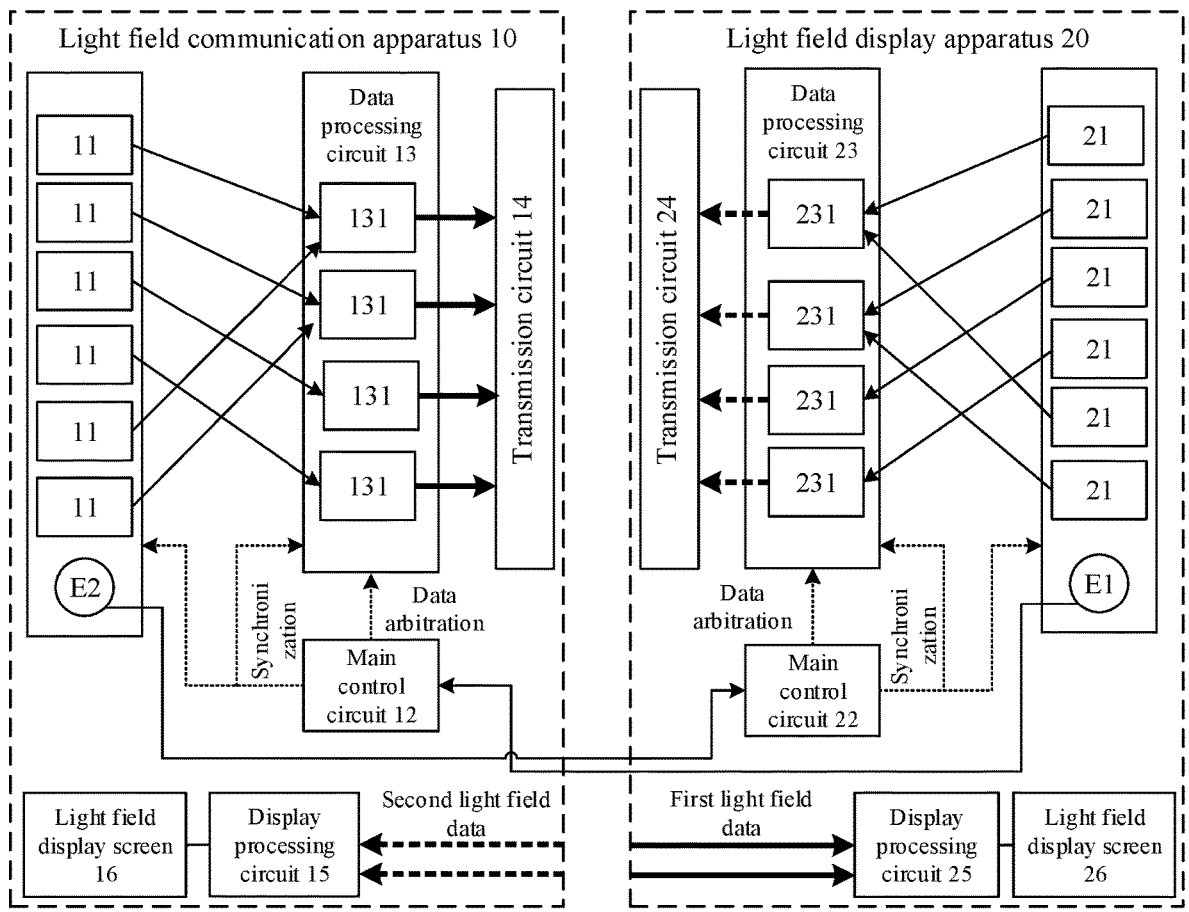
FIG. 4 is a schematic structural diagram of another light field data transmission system according to an embodiment of the present disclosure.

Illustratively, referring to FIG. 4, the light field display apparatus 20 may include an eye tracking camera E1. The eye tracking camera E1 can acquire a first gaze point location and send the first gaze point location to the light field communication apparatus 10. For example, after the eye tracking camera E1 captures an image of eyes of a viewer, coordinates of pupils of the eyes in the image may be determined. Then, the coordinates of the pupils in the image may be transformed according to the transformation relationship between an image coordinate system and a display screen coordinate system of the light field display screen 26, thereby acquiring the coordinates of the pupils in the display screen coordinate system, i.e., the first gaze point location.

Figure 5:
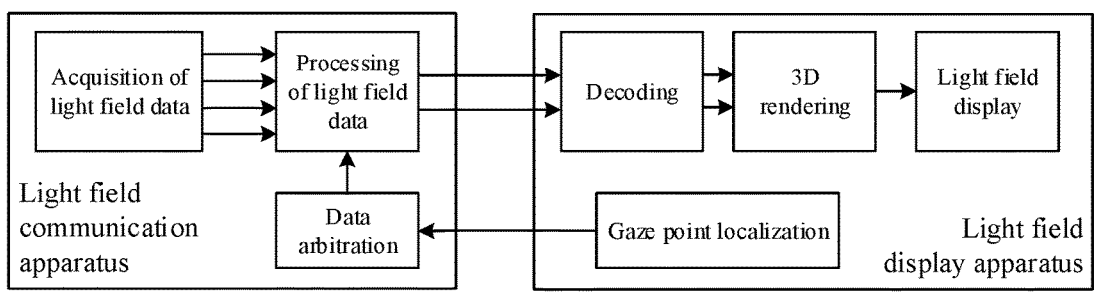
FIG. 5 is a schematic diagram illustrating the transmission of light field data according to an embodiment of the present disclosure.

As shown in FIG. 5, the process of the eye tracking camera E1 determining the first gaze point location may be referred to as gaze point localization.

In step 202, the light field communication apparatus determines at least one target camera corresponding to the first gaze point location from the first cameras according to the corresponding relationship between the gaze point locations and the cameras.

In the embodiment of the present disclosure, as shown in FIG. 4, the light field communication apparatus 10 includes a plurality of first cameras 11. The first cameras 11 are configured to acquire light field data. The light field data may be image data, for example, red-green-blue (RGB) image data, or may include RGB image data and depth map image data, i.e., RGBD image data.

Referring to FIG. 4, the light field communication apparatus 10 may also include a main control circuit 12. Optionally, the main control circuit 12 stores a corresponding relationship between the gaze point locations and the cameras in advance. A plurality of different gaze point locations is recorded in the corresponding relationship, the number of the at least one first camera 11 corresponding to each gaze point location being less than the number of the first cameras 11. The main control circuit 12 can receive the first gaze point location sent by the light field display apparatus 20, and determine at least one target camera corresponding to the first gaze point location based on the corresponding relationship between the gaze point positions and the cameras.

Or, the light field communication apparatus 10 may determine a field of view range of a viewer based on the first gaze point location, and then determine at least one target camera according to the field of view range and the range of collecting the light field data of each first camera 11. The active area of the first light field data acquired by the at least one target camera on the light field display screen can cover the field of view range, It may be understood that the first cameras 11 are arranged at different locations, and accordingly, the ranges of collecting the light field data of the first cameras 11 are different. The active area of the light field data acquired by the at least one first camera 11 corresponding to each gaze point location on the light field display screen can cover the field of view range at the gaze point location.

As shown in FIG. 5, the process of the main control circuit 12 determining the at least one target camera from the first gaze point location may be referred to as a data arbitration process.

Figure 6:
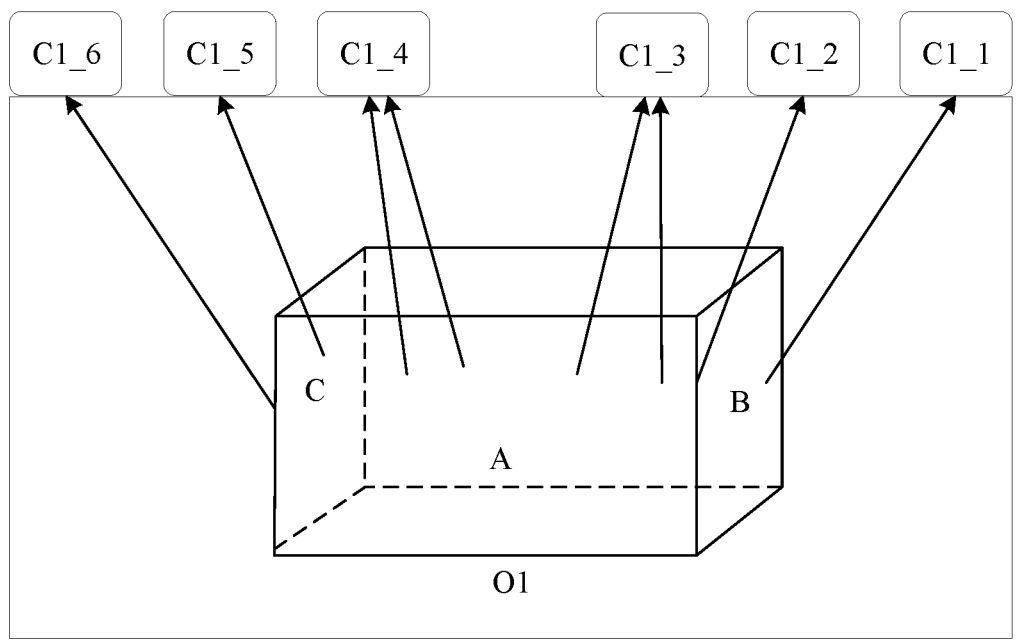
FIG. 6 is a schematic diagram illustrating the collection of light field data by first cameras according to an embodiment of the present disclosure.

FIG. 6 is a schematic diagram illustrating the collection of light field data acquired by a cube O1 by the first cameras 11 in the light field communication apparatus. As shown in FIG. 6, the light field communication apparatus is assumed to include six first cameras C1_1 to C1_6, wherein the range of collecting light field data of the first camera C1_1 covers the B-surface of the cube O1; the range of collecting light field data of the first camera C1_2 covers a partial area of the A-surface and a partial area of the B-surface in the cube O1, the A-surface being a surface between the B-surface and the C-surface in the cube O1; the range of collecting light field data of the first camera C1_3 covers partial areas of the A-surface and the B-surface in the cube O1; the range of collecting light field data of the first camera C1_4 covers the A-surface of the cube O1; the range of collecting light field data of the first camera C1_5 covers a partial area of the C-surface and a partial area of the A-surface in the cube O1; and the range of collecting light field data of the first camera C1_6 covers the C-surface of the cube O1.

Figure 7:
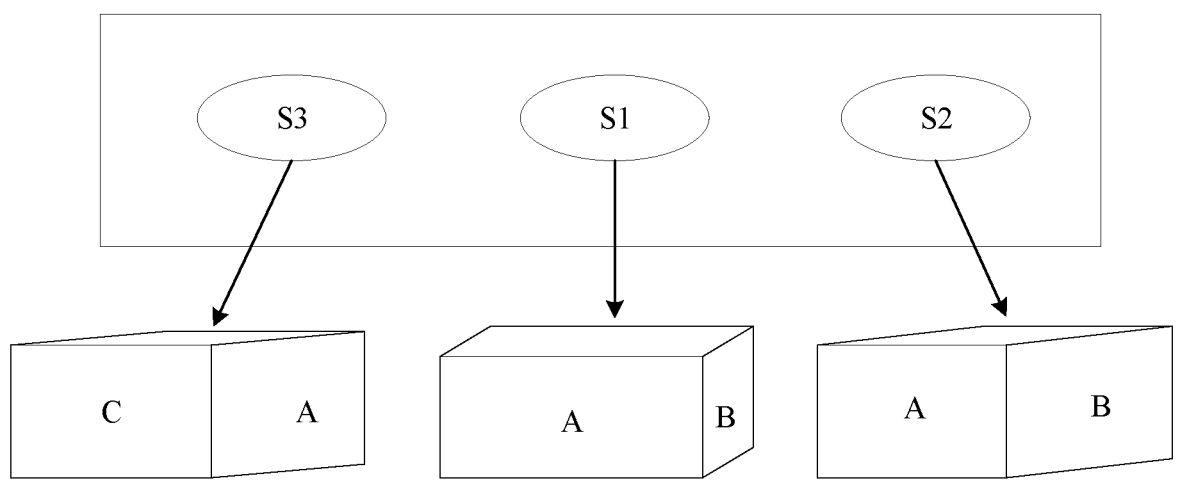
FIG. 7 is a schematic diagram illustrating the display of light field data by a light field display apparatus according to an embodiment of the present disclosure.

FIG. 7 is a schematic diagram of viewing ranges corresponding to different gaze point locations in the light field display screen of the light field display apparatus. Referring to FIG. 7, in a case that the gaze point location of the viewer is S1, the viewer can view partial areas of the A-surface and the B-surface in the cube O1 at the gaze point location S1. Since the ranges of collecting light field data of the first cameras C1_3 and C1_4 cover partial areas of the A-surface and the B-surface of the cube O1, the gaze point location S1 may correspond to the first cameras C1_3 and C1_4.

In a case that the gaze point location of the viewer is S2, the viewer can view the A-surface and the B-surface of the cube O1 at the gaze point location S2. Since the ranges of collecting light field data of the first cameras C1_1 to C1_3 cover the A-surface and the B-surface of the cube O1, the gaze point location S2 may correspond to the first cameras C1_1, C1_2, and C1_3. In a case that the gaze point location of the viewer is S3, the viewer can view the A-surface and the C-surface of the cube O1 at the gaze point location S3. Since the ranges of collecting light field data of the first cameras C1_4, C1_5, and C1_6 cover the A-surface and the C-surface of the cube O1, the gaze point location S3 corresponds to the first cameras C1_4, C1_5, and C1_6.

In step 203, the light field communication apparatus processes the first light field data acquired by the at least one target camera through at least one target data processing chip of the data processing chips.

Referring to FIG. 4, the light field communication apparatus 10 may further include a data processing circuit 13, wherein the data processing circuit 13 includes a plurality of data processing chips 131; and the data processing chips 131 may establish a connection with a plurality of first cameras 11, and each data processing chip 131 is connected with at least one first camera 11.

The main control circuit 12 of the light field communication apparatus 10 can control at least one target camera to acquire light field data after determining the at least one target camera from the first cameras 11. As shown in FIG. 5, the process may be referred to as acquisition of light field data. Then, the main control circuit 12 can control at least one target data processing chip in the data processing circuit 13 to acquire first light field data acquired by the at least one target camera, and process the first light field data, wherein the target data processing chip refers to a data processing chip connected with the target camera. In addition, the processing of the first light field data by each target data processing chip may include: distortion correction processing, projective transformation processing, color correction processing, encoding processing, and the like.

Optionally, in the corresponding relationship between the gaze point locations and the cameras, each gaze point location may correspond to a plurality of first cameras 11, and the first cameras 11 are connected with a plurality of different data processing chips 131 in a one-to-one correspondence. Accordingly, the first gaze point location corresponds to a plurality of target cameras, and the target cameras are connected with a plurality of different target data processing chips in a one-to-one correspondence. Based on the above corresponding and connection relationship, it may be ensured that each data processing chip 131 processes and transmits only the light field data acquired by one target camera connected therewith in a case that the light field data at each gaze point location are transmitted. Therefore, the processing resources of the data processing chips 131 occupied in the data processing process are effectively reduced, and the transmission bandwidth occupied by the light field data is reduced.

In the embodiment of the present disclosure, in a case that the number of the first cameras 11 included in the light field communication apparatus 10 is M, and the number of the data processing chips 131 included in the data processing circuit 13 is N, the maximum number of the first cameras 11 with which each data processing chip 131 can be connected is n, wherein the quantities M, N, and n satisfy the formula: N=Roundup (M/n); and M and N are integers greater than 1, n is an integer greater than 0, and Roundup stands for rounding up to an integer. In addition, in the corresponding relationship between the gaze point locations and the first cameras 11, the number of the first cameras 11 corresponding to each gaze point location is equal to or less than N.

Illustratively, it is assumed that M=10 and N=5, based on the above formula, it may be determined that N=2, that is, each data processing chip 131 can be connected with at most two first cameras 11. The connection topology between ten first cameras C1_1 to C1_10 and five data processing chips U1_1 to U1_5 in the light field communication apparatus 10 may be as shown in FIG. 8(a). Referring to FIG. 8(a), each data processing chip is connected with two first cameras. In addition, based on the connection relationship, in the corresponding relationship between the gaze point locations and the first cameras, the number of first cameras corresponding to each gaze point location is equal to or less than 5.

It is assumed that M=10 and N=4, based on the above formula, it may be determined that N=3, that is, each data processing chip 131 can be connected with at most three first cameras 11; and the connection topology between the ten first cameras C1_1 to C1_10 and the four data processing chips U1_1 to U1_4 in the light field communication apparatus 10 may be as shown in FIG. 7(b). Referring to FIG. 8(b), the data processing chips U1_1 and U1_2 may be connected with three first cameras, respectively, and the data processing chips U1_3 and U1_4 may be connected with two first cameras, respectively. Based on the connection relationship, in the corresponding relationship between the gaze point locations and the first cameras, the number of the first cameras 11 corresponding to each gaze point location is equal to or less than 4.

As a first possible implementation of step 203, the main control circuit 12 of the light field communication apparatus 10 may control the at least one target data processing chip to process the first light field data acquired by the at least one target camera, and does not process the light field data acquired by the first cameras 11 other than the at least one target camera.

In the first implementation, after the light field communication apparatus 10 establishes a communication connection with the light field display apparatus 20, the main control circuit 12 can control each first camera 11 to acquire light field data. In addition, the main control circuit 12 may send an identifier of at least one target camera to at least one target data processing chip connected with the at least one target camera after determining the at least one target camera, and each target data processing chip may further process only the first light field data acquired by one target camera connected therewith, and does not process the light field data acquired by other first cameras. Since the data processing chip 131 in the data processing circuit 13 does not need to process the light field data acquired by the first cameras 11, it is ensured that the processing resources occupied in the data processing process are relatively small, and thus the efficiency of data processing is relatively high.

As a second possible implementation of step 203, the main control circuit 12 of the light field communication apparatus 10 may control at least one target camera to acquire light field data, and control first cameras other than the at least one target camera of the first cameras 11 to stop transmitting light field data.

In the second implementation, the main control circuit 12 may control the first cameras 11 other than the at least one target camera to stop collecting the light field data, or may control the first cameras 11 other than the at least one target camera to continue collecting the light field data and stop transmitting the light field data to the data processing circuit 13.

It may also be understood that the two implementations described above may also be combined. That is, the main control circuit 12 may not only control the first cameras 11 other than the at least one target camera of the first cameras 11 to stop transmitting the light field data, but also control the at least one target data processing chip not to process the light field data acquired by the first cameras 11 other than the at least one target camera.

In step 204, the light field communication apparatus transmits the processed first light field data to the light field display apparatus.

Referring to FIG. 4, the light field communication apparatus 10 may further include a transmission circuit 14, wherein the transmission circuit 14 can transmit the first light field data output by the data processing circuit 13 to the light field display apparatus 20. For example, the transmission circuit 14 can transmit the first light field data from different target cameras output by the data processing circuit 13 to the light field display apparatus 20 in parallel.

Optionally, for a scene where the first gaze point location corresponds to a plurality of target cameras, referring to FIG. 4, the main control circuit 12 of the light field communication apparatus 10 is further configured to control the target cameras to synchronously collect the first light field data, and control the data processing circuit 13 to synchronously output the first light field data.

In step 205, the light field display apparatus performs light field display based on the processed first light field data.

As shown in FIG. 4, the light field display apparatus 20 further includes a display processing circuit 25 and a light field display screen 26. The display processing circuit 25 can process the first light field data after receiving the first light field data transmitted by the light field communication apparatus 10, and perform light field display through the light field display screen 26. Referring to FIG. 5, the processing of the first light field data by the display processing circuit 25 may include decoding process and 3D rendering process.

Optionally, the display processing circuit 25 may be a graphics processing unit (GPU). In addition, the display processing circuit 25 may be integrated in the light field display screen 26, or may be separated from the light field display screen 26.

It may be understood that the number of first cameras 11 in the light field communication apparatus 10 is positively correlated to the effect of the light field display apparatus 20 to display the light field data (i.e., the imaging quality of 3D images). Since the data volume of the light field data is relatively large, the real-time collection and processing of the light field data have large requirements on the processing resources and the transmission bandwidth of the light field communication apparatus. In a case that the light field communication apparatus 10 processes and transmits the light field data acquired by the first cameras 11, the transmission bandwidth and the display effect of the light field data cannot be both achieved.

In addition, the light field data (i.e., 3D images) displayed on the light field display screen 26 cannot completely enter the eyes of the viewer due to the limitation of the pupil size of the eyes of the viewer. That is, the viewer cannot simultaneously view all of the light field data displayed on the light field display screen 26. Therefore, in the method for transmitting light field data, redundant light field data occupy excessive transmission bandwidth.

In the embodiment of the present disclosure, based on the first gaze point location fed back by the light field display apparatus 20, the main control circuit 12 of the light field communication apparatus 10 may control the data processing circuit 13 to process and transmit only the first light field data acquired by the at least one target camera corresponding to the first gaze point location through data arbitration. Therefore, on the premise of ensuring the light field data viewing effect, redundant light field data are prevented from occupying excessive processing resources and transmission bandwidth, such that the light field data are acquired, processed and transmitted in real time.

In step 206, the light field communication apparatus acquires a second gaze point location through the eye tracking camera.

Optionally, referring to FIG. 4, the light field communication apparatus 10 may include: an eye tracking camera E2 and a light field display screen 16. The eye tracking camera E2 can track the location of the eyes (e.g., pupils) of the viewer of the light field communication apparatus 10 to determine the location of the eyes' gaze point on the light field display screen 16, i.e., the second gaze point location, wherein the second gaze point location may be a projection location of the pupils of the viewer on the light field display screen 16.

In the embodiment of the present disclosure, the light field communication apparatus 10 not only may be used as a light field data collection apparatus to provide light field data to the light field display apparatus 20, but also may be used as a display apparatus to perform light field display based on the light field data, wherein the light field communication apparatus 10 may acquire the second gaze point location by the eye tracking camera E2 after establishing a communication connection with the light field display apparatus 20. For example, the light field communication apparatus 10 may acquire and transmit the second gaze point location in real time, or the light field communication apparatus 10 may acquire and transmit the second gaze point location according to a preset tracking cycle.

In step 207, the light field communication apparatus transmits the second gaze point location to the light field display apparatus.

Referring to FIG. 4, the light field display apparatus 20 may include a main control circuit 22. After the eye tracking camera E2 of the light field communication apparatus 10 acquires the second gaze point location, the second gaze point location may be transmitted to the main control circuit 22 of the light field display apparatus 20.

In step 208, the light field display apparatus determines at least one target camera corresponding to the second gaze point location from the second cameras according to the corresponding relationship between the gaze point locations and the cameras.

In an embodiment of the present disclosure, as shown in FIG. 4, the light field display apparatus 20 may include a plurality of second cameras 21. The main control circuit 22 of the light field display apparatus 20 may also store a corresponding relationship between the gaze point locations and the cameras in advance. A plurality of different gaze point locations is recorded in the corresponding relationship, each gaze point location corresponds to at least one second camera 21, and the number of the at least one second camera 21 corresponding to each gaze point location is less than the number of the second cameras 21. The main control circuit 22 can receive the second gaze point location transmitted by the light field communication apparatus 10 and determine at least one target camera corresponding to the second gaze point location based on the corresponding relationship between the gaze point locations and the cameras.

Or, the light field display apparatus 20 may determine a field of view range of a viewer based on the second gaze point location, and then determine at least one target camera according to the field of view range and the range of collecting the light field data of each second camera 21. The active area of the second light field data acquired by the at least one target camera on the light field display screen 16 of the light field communication apparatus 10 can cover the field of view range.

In step 209, the light field display apparatus processes the second light field data acquired by the at least one target camera through at least one target data processing chip of the data processing chips.

Referring to FIG. 4, the light field display apparatus 20 may further include a data processing circuit 23, wherein the data processing circuit 23 may include a plurality of data processing chips 231; and the data processing chips 231 may establish a connection with a plurality of second cameras 21, and each data processing chip 231 is connected with at least one second camera 21. For the connection topology between the second cameras 21 and the data processing chips 231 in the light field display apparatus 20, reference may be made to the description of the connection topology between the first cameras 11 and the data processing chips 131 in the light field communication apparatus 10 as described above, and details shall not be repeated herein.

In the embodiment of the present disclosure, the main control circuit 22 can control at least one target data processing chip in the data processing circuit 23 to acquire the second light field data acquired by at least one target camera after determining the at least one target camera from the second cameras 21, and process the second light field data.

In step 210, the light field display apparatus sends the processed second light field data to the light field communication apparatus.

The implementation process of the step may refer to the related description of step 204, and details shall not be repeated herein.

In step 211, the light field communication apparatus performs light field display based on the second light field data.

The implementation process of the step may refer to the related description of step 205, and details shall not be repeated herein.

In the embodiment of the present disclosure, the light field communication apparatus 10, as a collection apparatus of light field data, provides the first light field data to the light field display apparatus 20, and the light field display apparatus 20, as a display apparatus, performs light field display based on the first light field data provided by the light field communication apparatus 10. In addition, the light field display apparatus 20, as a collection apparatus of light field data, may also provide the second light field data to the light field communication apparatus 10, and the light field communication apparatus 10, as a display apparatus, may in turn perform light field display based on the second light field data provided by the light field display apparatus 20. Therefore, the bidirectional transmission and display of the light field data between the light field communication apparatus 10 and the light field display apparatus 20 may be achieved.

Illustratively, the light field communication apparatus 10 and the light field display apparatus 20 may implement 3D video communication. After the light field communication apparatus 10 establishes a communication connection with the light field display apparatus 20, each of the two apparatuses may acquire and process light field data acquired by at least one target camera corresponding to the gaze point location in real time based on the gaze point location fed back by the other apparatus. Then, the two apparatuses may transmit the processed light field data and perform light field display based on the received light field data. Therefore, real-time, bidirectional 3D video communication may be achieved.

It may be understood that the sequence of the steps of the method for transmitting light field data according to the embodiments of the present disclosure may be appropriately adjusted, and the steps may also be correspondingly increased or decreased as needed. For example, the steps 206 to 211 may be deleted as needed. Or, the steps 206 to 211 may be performed before step 201. Or, step 206 may be performed synchronously with step 201. Any variations of the method that may be envisaged by those skilled in the art within the technical scope disclosed herein also fall within the protection scope of the present disclosure and thus are not described herein.

In summary, the embodiment of the present disclosure provides a method for transmitting light field data, wherein the light field communication apparatus can process first light field data acquired by at least one target camera corresponding to a first gaze point location based on the first gaze point location fed back by the light field display apparatus and then transmit the first light field data to the light field display apparatus. The light field display apparatus may in turn perform light field display based on the first light field data on the light field display screen thereof. Since the light field communication apparatus only needs to process and transmit the light field data acquired by part of the light field cameras and corresponding to the first gaze point location, the processing efficiency for light field data may be effectively improved and the transmission bandwidth occupied by the light field data is reduced without influencing the viewing effect.

An embodiment of the present disclosure provides a light field communication apparatus; referring to FIG. 4, the light field communication apparatus 10 includes: a main control circuit 12, a data processing circuit 13, and a plurality of first cameras 11, wherein the main control circuit 12 is configured to: receive a first gaze point location sent by a light field display apparatus 20, the first gaze point location being a location of a gaze point of eyes of a viewer of the light field display apparatus 20 on a light field display screen 26 of the light field display apparatus 20; and determine at least one target camera corresponding to the first gaze point location from the first cameras 11, the number of the at least one target camera being less than the number of the first cameras 11; and the data processing circuit 13 is configured to process first light field data acquired by at least one target camera and transmit the first light field data to the light field display apparatus 20, the processed first light field data being used for light field display of the light field display apparatus 20.

The main control circuit 12 may be a central processing unit (CPU) or a micro-controller unit (MCU).

Optionally, referring to FIG. 6, the first cameras 11 may be arranged around the light field display screen.

Optionally, the main control circuit 12 stores a corresponding relationship between the gaze point locations and the cameras. A plurality of different gaze point locations is recorded in the corresponding relationship, each gaze point location corresponds to at least one first camera 11, and the number of the corresponding at least one first cameras 11 is less than the number of the first cameras 11. The main control circuit 12 is configured to determine at least one target camera corresponding to the first gaze point location according to the corresponding relationship.

Optionally, as shown in FIG. 4, the data processing circuit 13 includes a plurality of data processing chips 131, each data processing chip 131 being connected with at least one first camera 11; and at least one target data processing chip of the data processing chips 131 is connected with the at least one target camera, the at least one target data processing chip being configured to process the first light field data acquired by the at least one target camera, wherein the data processing chip 131 may be a GPU. Or, the data processing chip 131 may be a programmable logic device (PLD), such as a complex programmable logic device (CPLD), a field programmable gate array (FPGA), or a general array logic (GAL), which is not limited in the embodiment of the present disclosure.

Optionally, the first gaze point location corresponds to a plurality of target cameras, and the target cameras are connected with a plurality of different target data processing chips in a one-to-one correspondence.

Optionally, each data processing chip 131 is connected with a plurality of first cameras 11; the main control circuit 12 is configured to control the at least one target data processing chip to process the first light field data acquired by the at least one target camera, without processing data acquired by the first cameras 11 other than the at least one target camera.

Optionally, the main control circuit 12 is further configured to: control the at least one target camera to acquire light field data and control the first cameras 11 of the first cameras 11 other than the at least one target camera to stop transmitting light field data.

Optionally, as shown in FIG. 4, the light field communication apparatus 10 may further include an eye tracking camera E2, a display processing circuit 15, and a light field display screen 16, wherein the eye tracking camera E2 is configured to acquire a second gaze point location and transmit the second gaze point location to the light field display apparatus 20, the second gaze point location being a location of a gaze point of eyes of the viewer of the light field communication apparatus 10 on the light field display screen 16 of the light field communication apparatus 10. The eye tracking camera E2 may be arranged around the light field display screen 16.

The display processing circuit 15 is configured to receive and process the second light field data transmitted by the light field display apparatus 20. The second light field data are acquired by at least one second camera 21 of the light field display apparatus 20, and the at least one second camera 21 is determined based on the second gaze point location. The light field display screen 26 is configured to perform light field display based on the second light field data.

In summary, the embodiment of the present disclosure provides a light field communication apparatus, wherein the light field communication apparatus can process first light field data acquired by at least one target camera corresponding to a first gaze point location based on the first gaze point location fed back by the light field display apparatus and then transmit the first light field data to the light field display apparatus. The light field display apparatus may in turn perform light field display based on the first light field data on the light field display screen thereof. Since the light field communication apparatus only needs to process and transmit the light field data acquired by part of the light field cameras and corresponding to the first gaze point location, the processing efficiency for light field data may be effectively improved and the transmission bandwidth occupied by the light field data is reduced without influencing the viewing effect.

It may be understood that, in the light field communication apparatus according to the above embodiments, the division of the functional modules is merely exemplary. In a practical application, the above functions may be assigned to different functional modules as needed, that is, the internal structure of the apparatus may be divided into different functional modules, so as to implement all or a part of the above functions.

In addition, the light field communication apparatus and the method for transmitting light field data according to the above embodiments belong to the same concept, specific implementation processes thereof are described in detail in the method embodiments, and details shall not be repeated herein.

Figure 8:
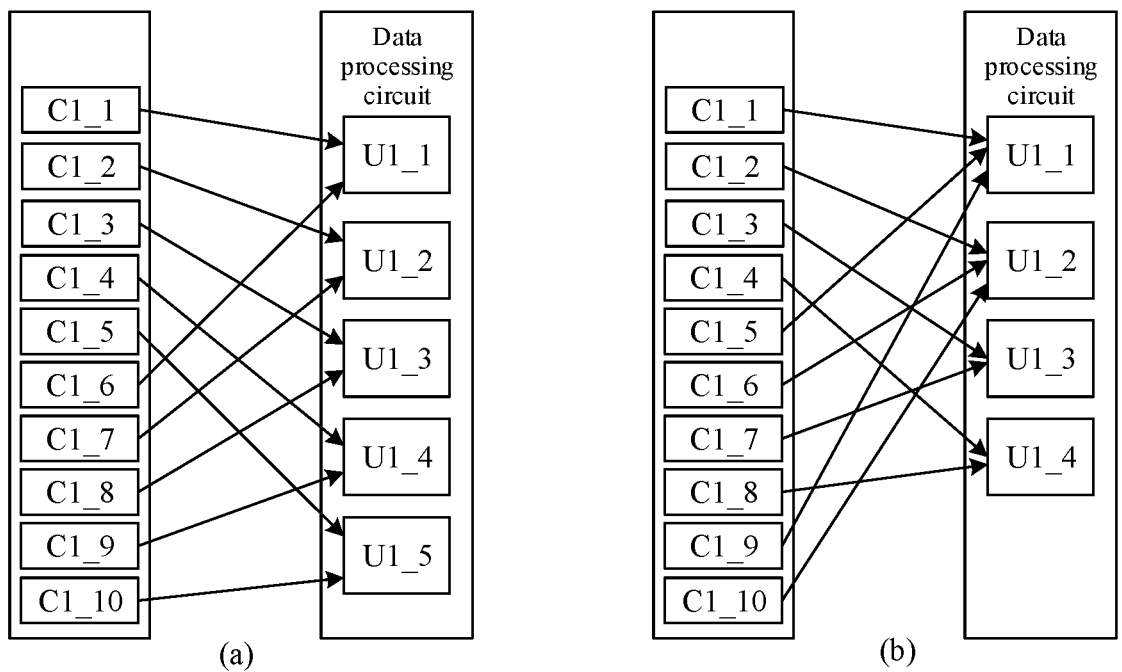
FIG. 8 is a connection topology diagram of cameras and data processing chips in a light field communication apparatus according to an embodiment of the present disclosure.
Figure 9:
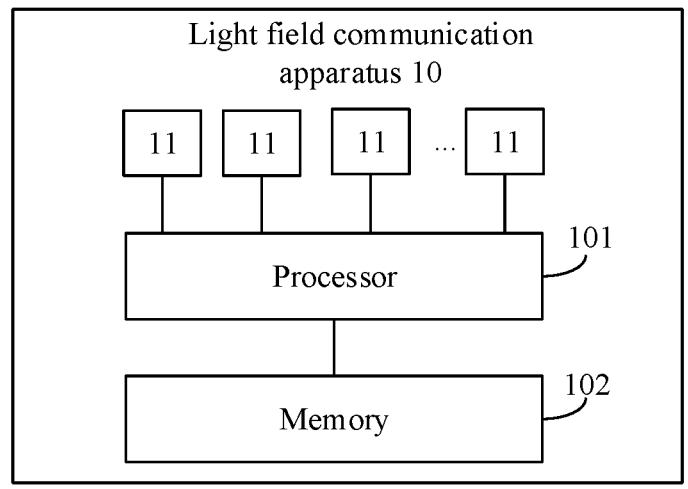
FIG. 9 is a structural block diagram of a light field communication apparatus according to an embodiment of the present disclosure.

The embodiment of the present disclosure further provides a light field communication apparatus which may be a computer device. As shown in FIG. 8, the light field communication apparatus includes: a plurality of first cameras 11, a processor 101, and a memory 102, the memory 102 having an instruction stored therein, wherein the instruction, when loaded and executed by the processor 101, causes the light field communication apparatus to implement the method for transmitting light field data according to the above method embodiments.

The embodiment of the present disclosure further provides a computer readable storage medium having an instruction stored therein, wherein the instruction, when loaded and executed by a processor, causes the light field communication apparatus to implement the method for transmitting light field data according to the above method embodiments.

The embodiment of the present disclosure further provides a computer program product or a computer program including a computer instruction. The computer instruction, when loaded and executed by a processor, causes the light field communication apparatus to implement the method for transmitting light field data as described in the above aspects.

It may be understood that the term "at least one" in the present disclosure refers to one or more, and the meaning of "a plurality of" refers to two or more.

It will be appreciated by those of ordinary skill in the art that all or a part of the steps for implementing the above embodiments may be completed by hardware, or may be completed by instructing relevant hardware by a program stored in a computer-readable storage medium. The storage medium mentioned above may be a read-only memory, a magnetic disk, an optical disk, or the like.

Described above are merely exemplary embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for transmitting light field data, wherein the method is performed by a light field communication apparatus, and the light field communication apparatus comprises a plurality of first cameras and a plurality of data processing chips, each data processing chip being connected with at least one of the first cameras; and the method comprises:

receiving a first gaze point location sent by a light field display apparatus, the first gaze point location being a location of a gaze point of eyes of a viewer of the light field display apparatus on a light field display screen of the light field display apparatus;

determining at least one target camera corresponding to the first gaze point location from the first cameras, a number of the at least one target camera being less than a number of the first cameras; and processing first light field data acquired by the at least one target camera through at least one target data processing chip of the data processing chips, and then transmitting the first light field data to the light field display apparatus, wherein the first light field data after processing is used for light field display of the light field display apparatus, and the at least one target data processing chip is connected with the at least one target camera.

2. The method according to claim 1, wherein a corresponding relationship between gaze point locations and cameras is stored in the light field communication apparatus, wherein a plurality of different gaze point locations is recorded in the corresponding relationship, each gaze point location corresponds to at least one of the first cameras, and a number of the at least one of the first cameras corresponding to each gaze point location is less than the number of the first cameras; and determining the at least one target camera corresponding to the first gaze point location from the first cameras comprises:

determining the at least one target camera corresponding to the first gaze point location according to the corresponding relationship.

3. The method according to claim 1, wherein the first gaze point location corresponds to a plurality of target cameras; and the target cameras are connected with a plurality of different target data processing chips in a one-to-one correspondence.

4. The method according to claim 1, wherein each data processing chip is connected with a plurality of first cameras; and processing the first light field data acquired by the at least one target camera through the at least one target data processing chip of the data processing chips comprises:

controlling the at least one target data processing chip to process the first light field data acquired by the at least one target camera, without processing data acquired by first cameras other than the at least one target camera.

5. The method according to claim 1, wherein before processing the first light field data acquired by the at least one target camera, the method further comprises:

controlling the at least one target camera to acquire light field data and controlling first cameras other than the at least one target camera to stop transmitting light field data.

6. The method according to claim 1, wherein the light field communication apparatus further comprises an eye tracking camera and a light field display screen; and the method further comprises:

acquiring, by the eye tracking camera, a second gaze point location, the second gaze point location being a location of a gaze point of eyes of a viewer of the light field communication apparatus on the light field display screen of the light field communication apparatus;

transmitting the second gaze point location to the light field display apparatus;

receiving second light field data transmitted by the light field display apparatus, wherein the second light field data are acquired by at least one second camera in the light field display apparatus, and the at least one second camera is determined based on the second gaze point location; and performing light field display based on the second light field data.

7. A light field communication apparatus, comprising: a main control circuit, a data processing circuit, a plurality of first cameras, and a plurality of data processing chips, each data processing chip being connected with at least one of the first cameras, wherein the main control circuit is configured to:

receive a first gaze point location sent by a light field display apparatus, the first gaze point location being a location of a gaze point of eyes of a viewer of the light field display apparatus on a light field display screen of the light field display apparatus; and determine at least one target camera corresponding to the first gaze point location from the first cameras, a number of the at least one target camera being less than a number of the first cameras; and the data processing circuit is configured to process first light field data acquired by the at least one target camera through at least one target data processing chip of the data processing chips, and then transmit the first light field data to the light field display apparatus, wherein the first light field data after processing is used for light field display of the light field display apparatus, and the at least one target data processing chip is connected with the at least one target camera.

8. The light field communication apparatus according to claim 7, wherein a corresponding relationship between gaze point locations and cameras is stored in the main control circuit, wherein a plurality of different gaze point locations is recorded in the corresponding relationship, each gaze point location corresponds to at least one of the first cameras, and a number of the at least one of the first cameras corresponding to each gaze point location is less than the number of the first cameras; and the main control circuit is configured to determine at least one target camera corresponding to the first gaze point location according to the corresponding relationship.

9. The light field communication apparatus according to claim 7, wherein the first gaze point location corresponds to a plurality of target cameras; and the target cameras are connected with a plurality of different target data processing chips in a one-to-one correspondence.

10. The light field communication apparatus according to claim 7, wherein each data processing chip is connected with a plurality of first cameras; and the main control circuit is configured to:

control the at least one target data processing chip to process the first light field data acquired by the at least one target camera, without processing data acquired by first cameras other than the at least one target camera.

11. The light field communication apparatus according to claim 7, wherein the main control circuit is further configured to:
control the at least one target camera to acquire light field data and control first cameras other than the at least one target camera to stop transmitting light field data.

12. The light field communication apparatus according to claim 7, further comprising an eye tracking camera, a display processing circuit, and a light field display screen;
the eye tracking camera is configured to acquire a second gaze point location and transmit the second gaze point location to the light field display apparatus, the second gaze point location being a location of a gaze point of eyes of a viewer of the light field communication apparatus on the light field display screen of the light field communication apparatus;
the display processing circuit is configured to receive and process second light field data transmitted by the light field display apparatus, wherein the second light field data are acquired by at least one second camera in the light field display apparatus, and the at least one second camera is determined based on the second gaze point location; and
the light field display screen is configured to perform light field display based on the second light field data.

13. A light field data transmission system, comprising: a light field communication apparatus and a light field display apparatus,
wherein the light field communication apparatus is the light field communication apparatus according to claim 7; and
the light field display apparatus is configured to send a first gaze point location to the light field communication apparatus and perform light field display based on first light field data transmitted by the light field communication apparatus.

14. The light field data transmission system according to claim 13, wherein a corresponding relationship between gaze point locations and cameras is stored in the main control circuit, wherein a plurality of different gaze point locations is recorded in the corresponding relationship, each gaze point location corresponds to at least one of the first cameras, and a number of the at least one of the first cameras corresponding to each gaze point location is less than the number of the first cameras; and
the main control circuit is configured to determine at least one target camera corresponding to the first gaze point location according to the corresponding relationship.

15. The light field data transmission system according to claim 13, wherein the first gaze point location corresponds to a plurality of target cameras; and
the target cameras are connected with a plurality of different target data processing chips in a one-to-one correspondence.

16. The light field data transmission system according to claim 13, wherein each data processing chip is connected with a plurality of first cameras; and the main control circuit is configured to:
control the at least one target data processing chip to process the first light field data acquired by the at least one target camera, without processing data acquired by first cameras other than the at least one target camera.

17. The light field data transmission system according to claim 13, wherein the main control circuit is further configured to:
control the at least one target camera to acquire light field data and control first cameras other than the at least one target camera to stop transmitting light field data.

* * * * *